(No Model.)

D. W. STANDEFORD.
SAW TABLE GAGE.

No. 333,562. Patented Jan. 5, 1886.

WITNESSES

D. W. Standeford
INVENTOR
by G. B. Harris
Attorney

UNITED STATES PATENT OFFICE.

DAVID W. STANDEFORD, OF OAKLAND, CALIFORNIA.

SAW-TABLE GAGE.

SPECIFICATION forming part of Letters Patent No. 333,562, dated January 5, 1886.

Application filed July 5, 1883. Serial No. 100,089. (No model.)

*To all whom it may concern:*

Be it known that I, DAVID W. STANDEFORD, a citizen of the United States, residing in Oakland, in the county of Alameda and State of California, have invented a new and useful Improvement in Saw-Table Guides, of which the following is a specification.

My invention relates to saw-table guides; and it consists in certain construction and operation by which the sawdust and splinters are cleared from the table and kept from interference with the placing of the lumber.

My invention will be more readily understood by referring to the accompanying drawings, in which—

Figure 1:
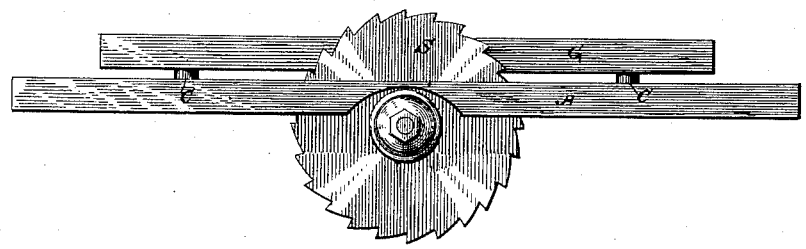
Figure 2:
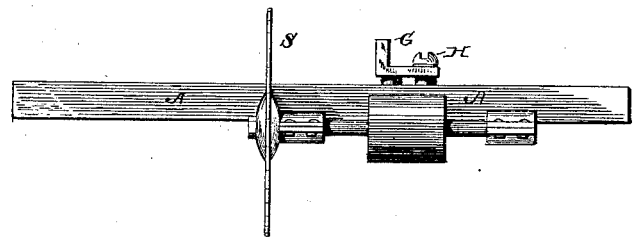
Figure 3:

Figure 1 is a side elevation, and Fig. 2 an end elevation, of a saw-table with my improved guide G attached. Fig. 3 is an under plan view of the saw-guide, showing the bearing blocks or feet C C and $C^2$.

The table A is constructed in the same manner as the ordinary circular-saw table, and adjusted to the saw by any similar arrangement of guides and set-screws. I have shown one form of adjustment by means of the set-screw H.

The guide G has the feet or blocks C C and $C^2$ to raise it from the saw-table and allow the sawdust to pass under, instead of packing against the guide, as it does where no feet are employed to raise the same. It is intended to raise the guide sufficiently to allow the splinters, which are frequently left hanging to the corners of the lumber, to project under the guide G, while the face of the lumber bears solidly against the face of the guide, thus insuring a true gage or required breadth of cut.

I place the feet or blocks C and C a little back from the front edge of the saw-guide and form it so as to present no flat surface or sharp corner to catch the splinters or sawdust. I form the front of the block $C^2$ in the same manner, but elongate it, so as to extend to the back edge of the guide G.

The following is the operation of the same: The guide G being set at the distance from the saw to make the required cut by means of the set-screw H, the board or other lumber is laid upon the saw-table A, and any splinters that may project from the corner next to the guide G pass under the edge of the guide, while the lumber is allowed to bear evenly against the face of the same, thereby securing the required gage for the part cut off, while a piece of lumber cut upon a saw-table having the ordinary saw-guide will be held away from the guide by any splinter that may adhere to the corner of the lumber, or by sawdust packed up against the guide, thus interfering with the gaging of the lumber.

In order to define more clearly the scope of my invention, I would have it understood that I am aware of Patent No. 278,128, granted to W. H. Gray, May 22, 1883, and do not seek to claim anything therein shown; but,

Having thus described my invention, what I claim, and desire to secure by Letters Patent, is—

1. The combination, with the table A, of the guide G, having the depending feet at its ends, said feet resting on the table A and supporting the guide from contact therewith, so as to leave a space between the guide and table, for the purpose set forth.

2. The combination, with the table A, of the guide G, having the depending feet C and the elongated foot $C^2$, as set forth.

D. W. STANDEFORD.

Witnesses:
F. D. HINDS,
L. H. CARY.